United States Patent
Kitayama

(10) Patent No.: US 8,133,564 B2
(45) Date of Patent: Mar. 13, 2012

(54) MOLDING MATERIAL FOR BLU-RAY DISC SUBSTRATE AND MOLDING MATERIAL FOR HD DIGITAL VERSATILE DISC SUBSTRATE

(75) Inventor: Masahiro Kitayama, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 754 days.

(21) Appl. No.: 12/281,708

(22) PCT Filed: Mar. 7, 2007

(86) PCT No.: PCT/JP2007/054391
§ 371 (c)(1), (2), (4) Date: Sep. 4, 2008

(87) PCT Pub. No.: WO2007/102529
PCT Pub. Date: Sep. 13, 2007

(65) Prior Publication Data
US 2009/0011170 A1    Jan. 8, 2009

(30) Foreign Application Priority Data
Mar. 7, 2006    (JP) .................................. 2006-061665

(51) Int. Cl.
*B32B 3/02* (2006.01)
(52) U.S. Cl. .................. 428/64.1; 428/64.4; 430/270.11
(58) Field of Classification Search .................. 428/64.4
See application file for complete search history.

(56) References Cited

U.S. PATENT DOCUMENTS
6,921,784 B2 *  7/2005 Dohi et al. ..................... 524/117

FOREIGN PATENT DOCUMENTS

| JP | 04 253765 | 9/1992 |
|---|---|---|
| JP | 09 176474 | 7/1997 |
| JP | 2002 194200 | 7/2002 |
| JP | 2004 331808 | 11/2004 |
| JP | 2005 272691 | 10/2005 |

\* cited by examiner

*Primary Examiner* — Elizabeth Mulvaney
(74) *Attorney, Agent, or Firm* — Oblon, Spivak, McClelland, Maier & Neustadt, L.L.P.

(57) ABSTRACT

Provided are: a molding material for a Blu-ray Disc substrate or an HD DVD substrates which is reduced in the occurrence of appearance failures and can realize a stable yield; and a method of producing the molding material. The molding material for a Blu-ray Disc substrate or an HD DVD substrate includes: an aromatic PC resin produced by an interfacial method (A); 150 to 350 ppm (in terms of mass ppm of a total amount of the molding material, the same applies hereinafter) of fatty acid monoglyceride having 14 to 30 carbon atoms (B); 10 to 150 ppm of PETS (C); and 30 to 120 ppm of antioxidant (D). The method of producing the molding material includes: introducing the component (A) into an extruder together with, with respect to the amount of the component (A), 150 to 350 ppm of fatty acid monoglyceride having 14 to 30 carbon atoms (B), 10 to 150 ppm of PETS (C), 30 to 120 ppm of antioxidant (D), and 500 to 1,000 ppm of water (E) having an electrical conductivity of 1 μS/cm or less at 25° C., each amount being ppm of the ingredient (A) such that the water content of the PC resin in the extruder is adjusted to 500 to 1,300 ppm; producing a strand from the mixture by melt extrusion molding; cooling the strand; and cutting the strand into pellets.

20 Claims, No Drawings

US 8,133,564 B2

MOLDING MATERIAL FOR BLU-RAY DISC SUBSTRATE AND MOLDING MATERIAL FOR HD DIGITAL VERSATILE DISC SUBSTRATE

TECHNICAL FIELD

The present invention relates to a molding material for a Blu-ray Disc substrate and a molding material for an HD Digital Versatile Disc (hereinafter, may be abbreviated as HD DVD) substrate, to methods of producing the molding materials, and to the Blue-ray Disc substrate and the HD DVD substrate. In particular, the present invention relates to a molding material for a Blu-ray Disc substrate and a molding material for an HD DVD substrate each having reduced appearance failures called comets, to methods of producing the molding materials, and to the Blue-ray Disc substrate and the HD DVD substrate.

BACKGROUND ART

In recent years, Blue-ray Discs and HD DVDs have been developed as next generation optical discs. As a molding material to be used for production of a Blu-ray Disc substrate or an HD DVD substrate, Patent Document 1, for example, discloses a polycarbonate resin composition for an optical information substrate containing a partial ester of saturated aliphatic acid carboxylic acid having 10 to 30 carbon atoms and polyhydric alcohol and a full ester of saturated aliphatic carboxylic acid having 10 to 30 carbon atoms and polyhydric alcohol mixed with a polycarbonate resin produced by an ester exchange method.

The polycarbonate resin composition in Patent Document 1 employs the polycarbonate resin produced by an ester exchange method. However, in the case where a substrate for an optical information medium such as a CD (compact disc) or a DVD is produced by using the polycarbonate resin produced by an ester exchange method, a difference in terminal groups of the polycarbonate resin to be obtained causes disadvantages such as a lower glass transition point than that of a polycarbonate resin obtained by an interfacial method so as to provide a short molding cycle or deformation of a substrate during releasing with increasing die temperature. Further, the polycarbonate resin produced by an ester exchange method has reactivity with a partial ester to be added, and a residual amount of the partial ester after pelletization tends to be reduced.

Meanwhile, in the case where burr or the like caused by charging of a substrate is adhered to the substrate in a step of producing a Blu-ray Disc substrate or an HD DVD substrate through injection molding, appearance failures called comets form on a Blu-ray Disc or an HD DVD. Formation of the comets causes problems in that defective phenomena such as error in reading of the Blu-ray Disc or the HD DVD occur.

Charging of the substrate taken out of an extruder causes adherence of fine resin burr derived from the extruder or suspended dust to a substrate surface after molding. The comets as used herein refer to streak defects formed from an inner periphery to an outer periphery of the substrate in a radius direction due to convex parts formed of the adhered products. In the case of a Blu-ray Disc, the comets form after formation of a reflective film on a Blu-ray Disc substrate surface through sputtering, vapor deposition, or the like and during formation of a transparent protective layer having a thickness of 0.1 mm by a spin coating method or the like by using a UV (ultraviolet light)-curable resin because flow of the UV-curable resin is inhibited by the convex part. In the case of an HD DVD Disc, the comets form during formation of a recording film on an HD DVD substrate by using an organic pigment by a spin coating method or the like in a similar manner to that of a conventional recordable optical disc such as a DVD-R because flow of the organic pigment is inhibited by the convex part.

Patent Document 1: JP-A-2004-331808

DISCLOSURE OF THE INVENTION

Problem to be Solved by the Invention

The present invention has been made in view of the circumstances described above, and an object of the present invention is to provide a molding material for a Blu-ray Disc substrate and a molding material for an HD DVD substrate each having reduced appearance failures called comets and capable of realizing a stable yield in a step of producing a Blu-ray Disc substrate or an HD DVD substrate through injection molding, methods of producing the molding materials, and the Blue-ray Disc substrate and the HD DVD substrate obtained through injection molding of the molding materials.

Means for Solving the Problem

The inventors of the present invention have conducted intensive studies, and have found that the above object can be attained with molding materials each having a specific partial ester and a specific full ester added in specific amounts to a specific polycarbonate resin.

That is, in a PC resin to be used as an optical disc substrate, the selection and addition amount of a releasing agent are very important. In a PC resin granulation step (pelletization step) involving extruding a PC resin powder with an extruder and cutting the resultant or in an optical disc substrate molding step, a PC resin composition containing pentaerythritol fatty acid full ester such as pentaerythritol stearic acid full ester (hereinafter, may be abbreviated as PETS) added to a PC resin has less reduced molecular weight due to decomposition of the PC resin and excellent thermal stability compared with a PC resin composition containing fatty acid monoglyceride such as stearic acid monoglyceride added to the PC resin.

Further, in a PC resin composition containing a trace amount (350 mass ppm or less) of fatty acid monoglyceride such as stearic acid monoglyceride added to a PC resin having a low viscosity average molecular weight of 10,000 to 17,000, low viscosity, and high fluidity, accurate measurement of the viscosity average molecular weight showing a significant difference in reduction of molecular weight due to decomposition of the PC resin involves difficulties. However, in the case where a PC resin composition containing more than 2,000 mass ppm of a releasing agent added to a PC resin having a viscosity average molecular weight of more than 19,000 is subjected to injection molding, a significant difference in reduction of the molecular weight due to the type and addition amount of the releasing agent can be recognized.

In the case of a DVD-R substrate, uniform applicability is degraded in application of an organic pigment through spin coating or the like when a charged potential of the DVD-R substrate just after molding is more than −2,000 V. This degradation can be alleviated to some extent by providing an electrostatic eliminator between a molding machine and a pigment spin coater.

However, under the molding conditions for a DVD-RAM substrate or a DVD-R substrate, that is, the conditions including a molding machine cylinder temperature of higher than 370° C. and a die temperature of higher than 110° C., burr forms easily from a surface between a mirror surface forming a die cavity and a peripheral ring or the like because a melt viscosity of a PC resin is very low. With this type of minute burr, burr formed on a substrate molded in a previous shot may adhere to a surface of a substrate to be molded in a subsequent shot or may be mixed into the substrate to be molded in a subsequent shot. The burr causes appearance failures called white spots or appearance failures called comets, to thereby cause reduction in production yield of an optical disc.

Therefore, a fatty acid monoglyceride content of 150 mass ppm is a lower limit providing both releasability and antistatic effect.

Meanwhile, excessive addition of fatty acid monoglyceride causes reduction in molecular weight of the PC resin or hydrolysis of the PC resin. Due to reduction in molecular weight of the PC resin in a molding step, a decomposition product derived from PC becomes a die adhered product, and thus frequent cleaning of the die is required. In a molding material for a DVD-RAM substrate or a molding material for a DVD-R substrate, an upper limit of a fatty acid monoglyceride content is adjusted to 350 mass ppm, to thereby prevent degradation of heat and humidity resistance due to excessive fatty acid monoglyceride.

The antistatic property, yield reduction and reduction in molecular weight due to burr formation, and hydrolysis are not caused by a difference in terminal structure of the PC resin such as a phenoxy group or a p-cumylphenoxy group and/or p-tert-butylphenoxy group, and are affected by the selection and addition amount of a releasing agent.

In a molding material for a DVD-R or the like, sufficient releasability is obtained by addition of fatty acid monoglyceride such as stearic acid monoglyceride in an amount of 350 mass ppm as an upper limit. However, the condition of a molding material for a Blu-ray Disc substrate or a molding material for an HD DVD substrate is more severe than that of the molding material for a DVD-R or the like. Increase in fatty acid monoglyceride in those molding materials for obtaining sufficient releasability causes reduction in molecular weight or hydrolysis of the PC resin in the molding step due to excessive fatty acid monoglyceride.

The inventors of the present invention have found that a molding material for a Blu-ray Disc substrate or a molding material for an HD DVD substrate each having reduced appearance failures called comets and capable of realizing a stable yield can be obtained in a step of producing a substrate through injection molding by using a specific amount of PETS which is a releasing agent having no antistatic effect but having excellent releasability and capable of suppressing reduction in molecular weight of the PC resin or hydrolysis of the PC resin in the molding step and a specific amount of fatty acid monoglyceride for covering insufficient releasability. The present invention has been completed based on the findings described above.

That is, the present invention provides a molding material for a Blu-ray Disc substrate and a molding material for an HD DVD substrate, methods of producing the molding materials, and the Blue-ray Disc substrate and the HD DVD substrate obtained through injection molding of the molding materials.

1. A molding material for a Blu-ray Disc substrate, including: an aromatic polycarbonate resin produced by an interfacial method (A); 150 to 350 mass ppm of fatty acid monoglyceride having 14 to 30 carbon atoms (B) with respect to a total amount of the molding material; 10 to 150 mass ppm of pentaerythritol fatty acid full ester (C) with respect to the total amount of the molding material; and 30 to 120 mass ppm of an antioxidant (D) with respect to the total amount of the molding material.

2. A molding material for a Blu-ray Disc substrate according to the item 1, in which a viscosity average molecular weight (Mv) of the aromatic polycarbonate resin produced by the interfacial method (A) is 14,000 to 17,000.

3. A molding material for a Blu-ray Disc substrate according to the item 1 or 2, in which the pentaerythritol fatty acid full ester (C) includes pentaerythritol palmitic acid full ester and/or pentaerythritol stearic acid full ester.

4. A method of producing a molding material for a Blu-ray Disc substrate, including: introducing an aromatic polycarbonate resin produced by an interfacial method (A) into an extruder together with, with respect to the amount of the component (A), 170 to 380 mass ppm of fatty acid monoglyceride having 14 to 30 carbon atoms (B), 30 to 180 mass ppm of pentaerythritol fatty acid full ester (C), 30 to 120 mass ppm of an antioxidant (D), and 500 to 1,000 mass ppm of water (E) having an electrical conductivity of 1 µS/cm or less at 25° C. such that a water content of the polycarbonate resin in the extruder is adjusted to 500 to 1,300 mass ppm; producing a strand from the mixture by melt extrusion molding; cooling the strand; and cutting the strand into pellets.

5. A Blue-ray Disc substrate, formed by molding the molding material according to any one of the items 1 to 3.

6. A molding material for an HD Digital Versatile Disc substrate, including: an aromatic polycarbonate resin produced by an interfacial method (A); 150 to 350 mass ppm of fatty acid monoglyceride having 14 to 30 carbon atoms (B) with respect to a total amount of the molding material; 10 to 150 mass ppm of pentaerythritol fatty acid full ester (C) with respect to the total amount of the molding material; and 30 to 120 mass ppm of an antioxidant (D) with respect to the total amount of the molding material.

7. A molding material for an HD Digital Versatile Disc substrate according to the item 6, in which a viscosity average molecular weight (Mv) of the aromatic polycarbonate resin produced by the interfacial method (A) is 14,000 to 17,000.

8. A molding material for an HD Digital Versatile Disc substrate according to the items 6 or 7, in which the pentaerythritol fatty acid full ester (C) includes pentaerythritol palmitic acid full ester and/or pentaerythritol stearic acid full ester.

9. A method of producing a molding material for an HD Digital Versatile Disc substrate, including: introducing an aromatic polycarbonate resin produced by an interfacial method (A) into an extruder together with, with respect to the amount of the component (A), 170 to 380 mass ppm of fatty acid monoglyceride having 14 to 30 carbon atoms (B), 30 to 180 mass ppm of pentaerythritol fatty acid full ester (C), 30 to 120 mass ppm of an antioxidant (D), and 500 to 1,000 mass ppm of water (E) having an electrical conductivity of 1 µS/cm or less at 25° C. such that a water content of the polycarbonate resin in the extruder is adjusted to 500 to 1,300 mass ppm; producing a strand from the mixture by melt extrusion molding; cooling the strand; and cutting the strand into pellets.

10. An HD Digital Versatile Disc substrate, formed by injection molding the molding material according to any one of the items 6 to 8.

Effects of the Invention

The present invention can provide a molding material for a Blu-ray Disc substrate and a molding material for an HD DVD substrate each having reduced appearance failures called comets and capable of realizing a stable yield in a step of producing a Blu-ray Disc substrate or an HD DVD substrate through injection molding.

BEST MODE FOR CARRYING OUT THE INVENTION

A molding material for a Blu-ray Disc substrate of the present invention includes: an aromatic polycarbonate (hereinafter, may be abbreviated as PC) resin produced by an interfacial method (A); 150 to 350 mass ppm of fatty acid monoglyceride having 14 to 30 carbon atoms (B) with respect to a total amount of the molding material; 10 to 150 mass ppm of pentaerythritol fatty acid full ester (C) with respect to the total amount of the molding material; and 30 to 120 mass ppm of an antioxidant (D) with respect to the total amount of the molding material.

The PC resin as the component (A) used in the present invention is produced by an interfacial method. The interfacial method refers to a method generally involving: introducing a phosgene gas into an alkaline solution of an aromatic dihydroxy compound to produce a chloroformate compound; and conducting a condensation reaction at an interface with a solvent such as methylene chloride in the presence of a catalyst such as a tertiary amine. In the present invention, a PC resin produced by using 2,2-bis(4-hydroxyphenyl)propane (general term: bisphenol A) as an aromatic dihydroxy compound is preferably used. Examples of the aromatic dihydroxy compound in addition to bisphenol A include: bis(4-hydroxyphenyl)alkane such as bis(4-hydroxyphenyl)methane, 1,1-bis(4-hydroxyphenyl)ethane, or 1,2-bis(4-hydroxyphenyl)ethane; bis(4-hydroxyphenyl)cycloalkane such as 1,1-bis(4-hydroxyphenyl)cyclohexane or 1,1-bis(4-hydroxyphenyl)cyclodecane; 4,4'-dihydroxydiphenyl; bis(4-hydroxyphenyl)oxide; bis(4-hydroxyphenyl)sulfide; bis(4-hydroxyphenyl)sulfone; bis(4-hydroxyphenyl)sulfoxide; and bis(4-hydroxyphenyl)ketone. One type of the aromatic dihydroxy compound may be used alone, or two or more types thereof may be mixed and used.

In the present invention, the reason for the use of the PC resin produced by an interfacial method as the component (A) is described below. That is, a PC resin produced by an ester exchange method has a lower glass transition temperature than that of the PC resin produced by an interfacial method due to its terminal group. Thus, in the case where a substrate for an optical information medium such as a CD (compact disc) or a DVD is produced by using a polycarbonate resin produced by an ester exchange method, disadvantages such as a short molding cycle or easy deformation of a substrate during releasing with increasing die temperature occur.

Further, the PC resin produced by an ester exchange method has reactivity with a partial ester. Thus, in the case where a resin composition containing the PC resin and a partial ester is pelletized, a residual amount of the partial ester in pellets tends to be reduced. A terminal group of the PC resin produced by an ester exchange method is generally a phenoxy group. Further, about 10 to 20 mol % of the terminal group excluding the phenoxy group remain as a hydroxyl group so that the PC resin has reactivity with the partial ester. Thus, from a viewpoint of molding property (mainly releasability), the present invention requires the use of the PC resin produced by an interfacial method.

A viscosity average molecular weight (Mv) of the PC resin as the component (A) used in the present invention is generally about 14,000 to 17,000 (corresponding to a viscosity number of 37.2 to 44.1), preferably 14,500 to 16,000 (corresponding to a viscosity number of 38.3 to 41.8), and more preferably 14,900 to 15,600 (corresponding to a viscosity number of 39.2 to 40.6). Note that the viscosity average molecular weight (Mv) refers to a value obtained by measuring the viscosity number (VN) in accordance with ISO 1628-4 (1999) and calculating the equation $Mv=430.4 VN-2001.8$.

The fatty acid monoglyceride having 14 to 30 carbon atoms as the component (B) of the present invention is used for improving releasability during injection molding of the molding material for a Blu-ray Disc substrate and antistatic property of the Blu-ray Disc substrate obtained through injection molding. Examples of fatty acid monoglyceride having 14 to 30 carbon atoms include stearic acid monoglyceride and palmitic acid monoglyceride. One type of fatty acid monoglyceride may be used alone, or two or more types thereof may be used in combination. In the present invention, stearic acid monoglyceride is preferred.

In the molding material for a Blu-ray Disc substrate of the present invention, a content of the fatty acid monoglyceride as the component (B) is 150 to 350 mass ppm and preferably 220 to 320 mass ppm with respect to the total amount of the molding material. A content of the component (B) of 150 mass ppm or more provides sufficient releasability and antistatic property, and a content thereof of 350 mass ppm or less provides sufficient heat and humidity resistance of the molding material.

The pentaerythritol fatty acid full ester as the component (C) of the present invention is used for improving releasability during injection molding of the molding material for a Blu-ray Disc substrate. Examples of the pentaerythritol fatty acid full ester include pentaerythritol stearic acid full ester and pentaerythritol palmitic acid full ester. One type of pentaerythritol fatty acid full ester may be used alone, or two more types thereof may be used in combination. In the present invention, pentaerythritol stearic acid full ester is preferred.

In the molding material for a Blu-ray Disc substrate of the present invention, a content of the pentaerythritol fatty acid full ester as the component (C) is 10 to 150 mass ppm and preferably 80 to 120 mass ppm with respect to the total amount of the molding material. A content of the component (C) of 10 mass ppm or more provides sufficient releasability, and a content thereof of 150 mass ppm or less provides a good balance between releasability and economic efficiency.

In the molding material for a Blu-ray Disc substrate of the present invention, 30 to 120 mass ppm and preferably 40 to 80 mass ppm of the antioxidant (D) is added with respect to the total amount of the molding material, to thereby improve process stability. Examples of the antioxidant include a phenol-based antioxidant and a phosphorus-based antioxidant.

The phenol-based antioxidant to be used in the present invention is not particularly limited, but a hindered phenol-based antioxidant is preferably used. Typical examples thereof include octadecyl-3-(3,5-di-tert-butyl-4-hydroxyphenyl)propionate, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythrityl-tetrakis[3-(3,5-di-tert-butyl-4-hydroxyphenyl)propionate], N,N'-hexamethylenebis[(3,5-di-tert-butyl-4-hydroxy)-hydrocinnamide], 2,2-thio-diethylenebis[3-(3,5-di-tert-butyl-4-hydroxyphenyl)propionate], 2,4-bis(n-octylthio)-6-(4-hydroxy-3,5-di-tert-butylanilino)-1,3,5-triazine, 1,3,5-trimethyl-2,4,6-tris(3,5-di-tert-butyl-4-hydroxybenzyl)benzene, tris-(3,5-di-tert-butyl-4-hydroxybenzyl)isocynuarate, and calcium bis(ethyl-3,5-di-tert-butyl-4-hydroxybenzyl phosphonate). Of those, octadecyl-3-(3,5-di-tert-butyl-4-hydroxyphenyl)propionate is preferably used.

The phosphorus-based antioxidant to be used in the present invention is not particularly limited. Typical examples thereof include: tris(nonylphenyl)phosphite; 2-ethylhexyldiphenyl phosphite; trialkyl phosphite such as trimethyl phosphite, triethyl phosphite, tributyl phosphite, trioctyl phosphite, trinonyl phosphite, tridecyl phosphite, trioctadecyl phosphite, distearyl pentaerythrityl diphosphite, tris(2-chloroethyl)phosphite, or tris(2,3-dichloropropyl)phosphite; tricycloalkyl phosphite such as tricyclohexyl phosphite; triaryl phosphite such as triphenyl phosphite, tricresyl phosphite, tris(ethylphenyl)phosphite, tris(butylphenyl)phosphite, tris(hydroxyphenyl)phosphite, or tris(2,4-di-tert-butylphenyl) phosphite; trialkyl phosphate such as trimethyl phosphate, triethyl phosphate, tributyl phosphate, trioctyl phosphate, tridecyl phosphate, trioctadecyl phosphate, distearyl pentaerythrityl phosphate, tris(2-chloroethyl)phosphate, or tris(2,3-dichloropropyl)phosphate; tricycloalkyl phosphate such as tricyclohexy-1-phosphate; and triaryl phosphate such as triphenyl phosphate, tricresyl phosphate, tris(nonylphenyl) phosphate, or 2-ethylphenyldiphenyl phosphate. Of those, triaryl phosphite and triaryl phosphate are preferably used.

A method of producing a molding material for a Blu-ray Disc substrate of the present invention is a production method including: introducing an aromatic polycarbonate resin produced by an interfacial method (A) into an extruder together with, with respect to the amount of the component (A), 150 to 350 mass ppm of fatty acid monoglyceride having 14 to 30 carbon atoms (B), 10 to 150 mass ppm of pentaerythritol fatty acid full ester (C), and 500 to 1,000 mass ppm of water (E) having an electrical conductivity of 1 μS/cm or less at 25° C. such that a water content of the polycarbonate resin in the extruder is adjusted to 500 to 1,300 mass ppm; producing a strand from the mixture by melt extrusion molding; cooling the strand; and cutting the strand into pellets.

The components (A), (B), (C), and (D) are the same as those described above. The extruder may employ a venting screw extruder or the like. In the step of introducing the components into the venting screw extruder and melt kneading the mixture to produce pellets, a water content of the PC resin as the component (A) just before introducing into the extruder is measured, and an amount of water to be added is adjusted such that the water content of the PC resin in the extruder is generally about 500 to 1,300 mass ppm (0.05 to 0.13 mass %) and preferably 800 to 1,000 mass ppm. About 500 to 1,000 mass ppm of water with respect to the amount of the component (A) is introduced into the extruder together with the component (A) for adjustment. Pure water having an electrical conductivity of 1 μS/cm or less at 25° C. is used from a viewpoint of long term reliability of an optical disc as a finished product, that is, quality control for preventing mixing of metal ions which may cause hydrolysis of polycarbonate as a material resin, in particular, alkali metal ions such as Na and metal ions serving as a polycarbonate decomposition catalyst at high temperatures and specifically Fe-based metal ions.

Adjustment of the water content of the PC resin as the component (A) to about 500 to 1,300 mass ppm prevents modification of fatty acid monoglyceride to diglyceride or triglyceride during melt extruding. Thus, degradation of releasability or antistatic property can be suppressed.

The present invention further provides a Blu-ray Disc substrate produced through injection molding of the molding material for a Blu-ray Disc substrate described above.

The molding material for a Blu-ray Disc substrate, the production method therefor, and the Blu-ray Disc substrate of the present invention are described above, and the same applies to the molding material for an HD DVD substrate, the production method therefor, and the HD DVD substrate of the present invention.

EXAMPLES

Next, the present invention will be described more specifically by way of Examples, but the present invention is not limited to Examples in any way.

Example 1

Stearic acid monoglyceride, pentaerythritol fatty acid full ester, tris(2,4-di-tert-butylphenyl)phosphite (trade name: Irgafos 168, manufactured by Ciba-Geigy K.K.) as a phosphorus-based antioxidant were mixed with a PC resin produced by an interfacial method (trade name: FN1500, viscosity average molecular weight: 15,000, manufactured by Idemitsu Kosan Co., Ltd.) in a ratio shown in Table 1, and the mixture was pelletized through melt extrusion molding. During melt extrusion molding, water having an electrical conductivity of 0.6 μS/cm measured at 25° C. was added in a ratio shown in the table. Contents of stearic acid monoglyceride and the like of the pellets before molding were determined by a gas chromatography method.

Note that, for the components (C) and (D), addition amounts refer to amounts with respect to the amount of the component (A), and residual amounts in the pellets refer to the amounts based on the total amount of the pellets. Thus, ratios of the residual amounts of the pentaerythritol fatty acid full ester and the phosphorus-based antioxidant in the pellets actually differ from the addition amounts but are represented as the same values as the addition amounts in about three significant digits.

The obtained PC resin pellets were molded with an optical disc molding machine equipped with a die for a DVD-R substrate (SD40ER, manufactured by Sumitomo Heavy Industries, Ltd.) under the conditions including a cylinder temperature of 390° C., a fixed side die temperature of 116° C., and a movable side die temperature of 117° C., to thereby produce a DVD-R substrate having a diameter of 12 cm. For adjusting the molding conditions closer to Blu-ray Disc substrate or HD DVD substrate molding conditions, which are stricter than DVD-R substrate molding conditions, a usual molding cycle of 4.5 seconds was reduced to 4.0 seconds. The obtained substrate was subjected to an evaluation test by the following method. Table 1 shows the results.

(1) Viscosity Number of PC Resin

The viscosity number of the PC resin was measured in accordance with ISO 1628-4 (1999).

(2) Measurement of Charged Potential of Molded Product Just after Molding

The charged potential of the molded product just after molding was measured by using a noncontact surface voltmeter (model 542-1, manufactured by Trek Japan KK).

(3) Measurement of Radial Tilt and Tangential Tilt

The radial tilt and the tangential tilt were measured by using an optical disc evaluation device (T-7DE, manufactured by Toryo AT Corporation). The radial tilt refers to a parameter showing warping in a radial direction of a disc substrate, and the tangential tilt refers to a parameter showing warping in a circumferential direction of the disc substrate.

(4) Die Adherence Test Through Continuous Molding

Die adherence through continuous molding was tested by dissembling, cleaning, and assembling a die before molding a substrate, continuously molding 10,000 substrates, and visually observing clouding of the die due to adherence on an adsorption line of a stamper in particular, on a periphery of a cavity ring, and on a back surface of the stamper. The observation was conducted by using an appearance inspection device (Basler S3, manufactured by Basler AG) through a polarizing plate. Note that the observation through a polarizing plate facilitates identification of clouding (clouding of a substrate surface caused by non-uniform releasing of a disc in a plane direction, microscopically observed states of unclear pits and edges of guide grooves) and the like.

(5) Disc Appearance Evaluation Test Through Continuous Molding

The disc appearance was evaluated by visually observing with an appearance inspection device (Basler S3, manufactured by Basler AG) through a polarizing plate.

(6) Yield by Damage Defect Inspection

Defects were inspected by an appearance inspection device (Basler S3, manufactured by Basler AG), and the yield was calculated.

(7) Constant Temperature and Humidity Test

An Al film was formed on a molded substrate through sputtering, and the resultant was subjected to UV coating. A substrate subjected to attachment and a substrate subjected to no sputtering, attachment, or the like were introduced into a constant temperature and humidity layer under the conditions of a temperature of 90° C. and a humidity of 90% RH for 100 hours. Then, the presence and absence of polarization defects with a diameter of 10 μm or more due to hydrolysis were visually observed by using a polarization optical microscope. The observation was conducted for five substrates each, that is, a total of ten substrates. A substrate with an average of 0 to 0.1 polarization defects observed was regarded as acceptable, and a substrate with an average of 0.2 or more polarization defects was rejected.

Examples 2 to 8

Substrates were produced in the same manner as in Example 1 by using respective components in a ratio shown in Table 1, and were evaluated in the same manner as in Example 1. Table 1 shows the results.

Comparative Example 1

As shown in Table 1, a substrate was produced in the same manner as in Example 1 except that no water was added during pelletization, and was evaluated in the same manner as in Example 1. Table 1 shows the results. Table 1 shows that the substrate of Comparative Example 1 had a small residual amount of stearic acid monoglyceride in pellets, a large absolute value of charged potential, and much appearance failures due to static electricity such as burr adherence. Further, deformation increased slightly during releasing, and as a result, tilts increased slightly.

Comparative Example 2

As shown in Table 1, a substrate was produced in the same manner as in Example 2 except that no water was added during pelletization and the addition amount of PETS was changed to 70 mass ppm, and was evaluated in the same manner as in Example 2. Table 1 shows the results. Table 1 shows that the substrate of Comparative Example 2 had a small residual amount of stearic acid monoglyceride, a large absolute value of charged potential, and much appearance failures due to static electricity such as burr adherence. Further, the amount of PETS was smaller compared to that of Comparative Example 1, and thus tilts increased more.

Comparative Example 3

As shown in Table 1, a substrate was produced in the same manner as in Example 1 except that the amount of stearic acid monoglyceride was increased to 450 mass ppm, and was evaluated in the same manner as in Example 1. Table 1 shows the results. Table 1 shows that in the substrate of Comparative Example 3, adherence to the die during continuous molding was slightly observed due to the increased amount of stearic acid monoglyceride. Further, the number of defects after the constant temperature and humidity test increased due to a large amount of the releasing agent.

Comparative Example 4

As shown in Table 1, a substrate was produced in the same manner as in Example 2 except that the amount of stearic acid monoglyceride was increased to 450 mass ppm, and was evaluated in the same manner as in Example 2. Table 1 shows the results. Table 1 shows that in the substrate of Comparative Example 4, adherence to the die during continuous molding was slightly observed due to the increased amount of stearic acid monoglyceride. Further, the number of defects after the constant temperature and humidity test was small because the addition amount of PETS was smaller than that of Comparative Example 3, but was larger than those of Examples.

Comparative Example 5

As shown in Table 1, a substrate was produced in the same manner as in Example 3 except that no water was added during pelletization and the addition amount of PETS was changed to 140 mass ppm, and was evaluated in the same manner as in Example 3. Table 1 shows the results. Table 1 shows that the substrate of Comparative Example 5 had a smaller residual amount of stearic acid monoglyceride than that of Comparative Example 1, a large absolute value of charged potential, and much appearance failures due to static electricity such as burr adherence. Further, tilts increased due to release deformation.

Comparative Example 6

As shown in Table 1, production of a substrate was attempted in the same manner as in Example 4 except that no water was added during pelletization and the addition amount of PETS was changed to 70 mass ppm. However, no releasing was conducted because the PETS amount was smaller than that of Comparative Example 5. Thus, no substrate was produced.

Comparative Example 7

As shown in Table 1, releasability maintenance was attempted by adding no PETS and increasing the amount of stearic acid monoglyceride. However, adherence to the die during continuous molding was slightly observed because the amount of stearic acid monoglyceride was large. Further, the number of defects after the constant temperature and humidity test increased.

Comparative Example 8

As shown in Table 1, no stearic acid monoglyceride was added and a large amount of PETS was added. However, no antistatic effect was obtained, and many white spots were observed due to burr adherence.

Comparative Example 9

As shown in Table 1, a substrate was produced in the same manner as in Example 3 except that the amount of PETS was increased to 300 mass ppm and was evaluated in the same manner as in Example 3. The number of defects after the constant temperature and humidity test increased slightly.

Comparative Example 10

As shown in Table 1, a substrate was produced in the same manner as in Example 1 except that no antioxidant was added. As a result, the disc turned yellow during molding.

Comparative Example 11

A substrate was produced in the same manner as in Examples by using a material for a compact disc substrate containing a PC resin obtained by an ester exchange method (trade name: PC-175, manufactured by Chimei-Asahi Corporation), and was evaluated in the same manner as in Examples. Table 1 shows the results. Table 1 shows that the substrate of Comparative Example 11 had a large absolute value of charged potential and many white spots due to burr adherence. Note that the amount of the components (C) and (D) in Table 1 refer to not addition amounts but contents in the pellets.

Production Example 1

Production of PC Resin by Ester Exchange Method

Into a Ni-steel autoclave (equipped with a stirrer) having an inner volume of 1.4 L, 228 g (1.0 mol) of bisphenol A (BPA), 226.8 g (1.06 mol) of diphenyl carbonate, and 20 mass % aqueous solution of tetramethylammonium hydroxide (TMAH) and 40 mass % aqueous solution of tetrabutylphosphonium hydroxide (TBPH) as catalysts were introduced so as to provide TMAH of $2.5 \times 10^{-4}$ mol/mol BPA and TBPH of $1 \times 10^{-5}$ mol/mol BPA. Then, nitrogen replacement was conducted five times.

A mixture was heated to 180° C. for a reaction for 30 minutes in a nitrogen atmosphere. Then, the temperature was increased gradually to 235° C., and a degree of vacuum was increased to 8.0 kPa (60 mmHg) for a reaction for 60 minutes. The temperature was increased gradually to 270° C., and the degree of vacuum was increased to 1.3 kPa (10 mmHg) for a reaction for 120 minutes. Then, a reaction was conducted for 30 minutes at a temperature of 270° C. and a degree of vacuum of 0.13 kPa (1 mmHg), and for 30 minutes at an increased degree of vacuum of 0.07 kPa (0.5 mmHg). After completion of the reaction, inside of the reactor was returned to atmospheric pressure with nitrogen. The content was taken out and pulverized, to thereby obtain polycarbonate. The obtained polycarbonate had a viscosity number of 50.4 and a ratio of a phenolic hydroxide group terminal in total terminal groups of 21 mol %.

Comparative Example 12

As shown in Table 1, a substrate was produced in the same manner as in Example 1 except that the PC resin obtained by an ester exchange method in Production Example 1 was used, and was evaluated in the same manner as in Example 1. Table 1 shows the results. Table 1 shows that the substrate of Comparative Example 12 had a large absolute value of charged potential and many white spots due to burr adherence.

TABLE 1

| | | Example 1 | Example 2 | Example 3 | Example 4 |
|---|---|---|---|---|---|
| (A) PC resin produced by interfacial method | | FN1500 | FN1500 | FN1500 | FN1500 |
| PC resin produced by ester exchange method | | — | — | — | — |
| (B) Addition amount of stearic acid monoglyceride to PC resin (mass ppm) | | 350 | 350 | 250 | 250 |
| Water content of PC resin just before introducing into extruder (mass ppm) | | 420 | 420 | 410 | 410 |
| (E) Addition amount of water to PC resin in extruder (mass ppm) | | 800 | 800 | 800 | 800 |
| (B) Residual amount of stearic acid monoglyceride in pellets (mass ppm) | | 320 | 310 | 210 | 210 |
| (C) Pentaerythritol stearic acid full ester (mass ppm) [addition amount, residual amount in pellets] | | 140 | 60 | 130 | 60 |
| (D) Phosphorus-based antioxidant (Irg. 168) (mass ppm) [addition amount, residual amount in pellets] | | 38 | 40 | 35 | 42 |
| Viscosity average molecular weight of PC resin (viscosity number) | | 40.2 | 40.1 | 40.0 | 40.2 |
| Viscosity average molecular weight of PC resin in pellets (viscosity number) | | 40.3 | 40.1 | 40.0 | 40.1 |
| Viscosity average molecular weight of PC resin in molded product (viscosity number) | | 40.2 | 40.2 | 40.1 | 40.2 |
| Charged potential of molded product just after molding (V) | | 360 | 380 | 420 | 450 |
| Radial tilt (radius 23 to 58 mm) | MAX | 0.283 | 0.590 | 0.268 | 0.490 |
| | MIN | −0.637 | −0.388 | −0.718 | −0.637 |
| | MAX − MIN | 0.920 | 0.978 | 0.986 | 1.127 |
| Tangential tilt (radius 23 to 58 mm) | MAX | 0.181 | 0.200 | 0.228 | 0.196 |
| | MIN | −0.181 | −0.164 | −0.231 | −0.216 |
| | MAX − MIN | 0.362 | 0.364 | 0.459 | 0.412 |
| Adherence to die after continuous molding | | No adherence | No adherence | No adherence | No adherence |
| Disc appearance after continuous molding | | No problem | No problem | No problem | No problem |
| Yield by defect inspection device | | 97% | 96% | 97% | 97% |
| Number of polarization defects with diameter of 10 μm at constant temperature and humidity (defect/substrate) | | 0.1 | 0 | 0.1 | 0.1 |

| | Example 5 | Example 6 | Example 7 | Example 8 |
|---|---|---|---|---|
| (A) PC resin produced by interfacial method | FN1500 | FN1500 | FN1500 | FN1500 |
| PC resin produced by ester exchange method | — | — | — | — |

TABLE 1-continued

| | | | | |
|---|---|---|---|---|
| (B) Addition amount of stearic acid monoglyceride to PC resin (mass ppm) | 180 | 210 | 280 | 300 |
| Water content of PC resin just before introducing into extruder (mass ppm) | 400 | 430 | 400 | 420 |
| (E) Addition amount of water to PC resin in extruder (mass ppm) | 800 | 800 | 800 | 800 |
| (B) Residual amount of stearic acid monoglyceride in pellets (mass ppm) | 160 | 180 | 240 | 280 |
| (C) Pentaerythritol stearic acid full ester (mass ppm) [addition amount, residual amount in pellets] | 100 | 100 | 100 | 100 |
| (D) Phosphorus-based antioxidant (Irg. 168) (mass ppm) [addition amount, residual amount in pellets] | 42 | 38 | 40 | 41 |
| Viscosity average molecular weight of PC resin (viscosity number) | 40.1 | 40.2 | 40.1 | 40.0 |
| Viscosity average molecular weight of PC resin in pellets (viscosity number) | 40.1 | 40.1 | 40.0 | 40.1 |
| Viscosity average molecular weight of PC resin in molded product (viscosity number) | 40.2 | 40.0 | 40.0 | 39.9 |
| Charged potential of molded product just after molding (V) | 480 | 450 | 400 | 390 |
| Radial tilt MAX (Radius 23 to 58 mm) | 0.423 | 0.550 | 0.455 | 0.322 |
| Radial tilt MIN | −0.785 | −0.632 | −0.567 | −0.623 |
| Radial tilt MAX − MIN | 1.208 | 1.182 | 1.022 | 0.945 |
| Tangential tilt MAX | 0.201 | 0.188 | 0.199 | 0.188 |
| Tangential tilt MIN | −0.228 | −0.222 | −0.192 | −0.187 |
| (Radius 23 to 58 mm) MAX − MIN | 0.429 | 0.410 | 0.391 | 0.375 |
| Adherence to die after continuous molding | No adherence | No adherence | No adherence | No adherence |
| Disc appearance after continuous molding | No problem | No problem | No problem | No problem |
| Yield by defect inspection device | 96% | 96% | 97% | 97% |
| Number of polarization defects with diameter of 10 μm at constant temperature and humidity (defect/substrate) | 0.1 | 0.1 | 0 | 0.1 |

| | Comparative Example 1 | Comparative Example 2 | Comparative Example 3 | Comparative Example 4 |
|---|---|---|---|---|
| (A) PC resin produced by interfacial method | FN1500 | FN1500 | FN1500 | FN1500 |
| PC resin produced by ester exchange method | — | — | — | — |
| (B) Addition amount of stearic acid monoglyceride to PC resin (mass ppm) | 350 | 350 | 450 | 450 |
| Water content of PC resin just before introducing into extruder (mass ppm) | 420 | 420 | 410 | 410 |
| (E) Addition amount of water to PC resin in extruder (mass ppm) | 0 | 0 | 800 | 800 |
| (B) Residual amount of stearic acid monoglyceride in pellets (mass ppm) | 60 | 50 | 410 | 420 |
| (C) Pentaerythritol stearic acid full ester (mass ppm) [addition amount, residual amount in pellets] | 140 | 70 | 140 | 60 |
| (D) Phosphorus-based antioxidant (Irg. 168) (mass ppm) [addition amount, residual amount in pellets] | 38 | 38 | 40 | 39 |
| Viscosity average molecular weight of PC resin (viscosity number) | 40.0 | 40.2 | 40.1 | 40.2 |
| Viscosity average molecular weight of PC resin in pellets (viscosity number) | 40.0 | 40.1 | 40.0 | 40.1 |
| Viscosity average molecular weight of PC resin in molded product (viscosity number) | 40.1 | 40.1 | 39.8 | 39.8 |
| Charged potential of molded product just after molding (V) | −1250 | −1310 | 340 | 320 |
| Radial tilt MAX (Radius 23 to 58 mm) | 0.631 | 0.676 | 0.518 | 0.254 |
| Radial tilt MIN | −0.904 | −0.978 | −0.453 | −0.799 |
| Radial tilt MAX − MIN | 1.535 | 1.654 | 0.971 | 1.053 |
| Tangential tilt MAX | 0.271 | 0.293 | 0.207 | 0.188 |
| Tangential tilt MIN | −0.305 | −0.321 | −0.189 | −0.207 |
| (Radius 23 to 58 mm) MAX − MIN | 0.576 | 0.614 | 0.396 | 0.395 |
| Adherence to die after continuous molding | No adherence | No adherence | Slight stain-like adherence | Slight stain-like adherence |
| Disc appearance after continuous molding | Clouding and white spots due to burr | Clouding and white spots due to burr | No problem | No problem |
| Yield by defect inspection device | 91% | 81% | 96% | 97% |
| Number of polarization defects with diameter of 10 μm at constant temperature and humidity (defect/substrate) | 0 | 0 | 0.3 | 0.2 |

| | Comparative Example 5 | Comparative Example 6 | Comparative Example 7 | Comparative Example 8 |
|---|---|---|---|---|
| (A) PC resin produced by interfacial method | FN1500 | FN1500 | FN1500 | FN1500 |
| PC resin produced by ester exchange method | — | — | — | — |
| (B) Addition amount of stearic acid monoglyceride to PC resin (mass ppm) | 250 | 250 | 650 | 0 |
| Water content of PC resin just before introducing into extruder (mass ppm) | 410 | 410 | 420 | 440 |
| (E) Addition amount of water to PC resin in extruder (mass ppm) | 0 | 0 | 800 | 0 |
| (B) Residual amount of stearic acid monoglyceride in pellets (mass ppm) | 10 | 10 | 590 | 0 |

TABLE 1-continued

| | | | | |
|---|---|---|---|---|
| (C) Pentaerythritol stearic acid full ester (mass ppm) [addition amount, residual amount in pellets] | 140 | 70 | 0 | 510 |
| (D) Phosphorus-based antioxidant (Irg. 168) (mass ppm) [addition amount, residual amount in pellets] | 41 | 44 | 42 | 39 |
| Viscosity average molecular weight of PC resin (viscosity number) | 40.1 | 39.9 | 40.0 | 40.1 |
| Viscosity average molecular weight of PC resin in pellets (viscosity number) | 40.2 | 40.0 | 40.1 | 40.1 |
| Viscosity average molecular weight of PC resin in molded product (viscosity number) | 40.2 | 40.1 | 39.7 | 40.0 |
| Charged potential of molded product just after molding (V) | −1360 | −1380 | 310 | −1420 |
| Radial tilt MAX (Radius 23 to 58 mm) | 0.712 | Not released | 0.341 | 0.543 |
| Radial tilt MIN | −1.150 | | −0.769 | −0.575 |
| Radial tilt MAX − MIN | 1.862 | | 1.110 | 1.118 |
| Tangential tilt MAX | 0.312 | | 0.213 | 0.253 |
| Tangential tilt MIN | −0.336 | | −0.23 | −0.261 |
| Tangential tilt (Radius 23 to 58 mm) MAX − MIN | 0.648 | | 0.443 | 0.514 |
| Adherence to die after continuous molding | No adherence | | Slight stain-like adherence | No adherence |
| Disc appearance after continuous molding | Clouding and white spots due to burr | | No problem | White spots due to burr |
| Yield by defect inspection device | 76% | | 97% | 89% |
| Number of polarization defects with diameter of 10 μm at constant temperature and humidity (defect/substrate) | 0 | | 0.4 | 0 |

| | Comparative Example 9 | Comparative Example 10 | Comparative Example 11 | Comparative Example 12 |
|---|---|---|---|---|
| (A) PC resin produced by interfacial method | FN1500 | FN1500 | — | — |
| PC resin produced by ester exchange method | — | — | — | Production Example 1 |
| (B) Addition amount of stearic acid monoglyceride to PC resin (mass ppm) | 250 | 350 | — | 350 |
| Water content of PC resin just before introducing into extruder (mass ppm) | 410 | 420 | — | 420 |
| (E) Addition amount of water to PC resin in extruder (mass ppm) | 800 | 800 | — | 800 |
| (B) Residual amount of stearic acid monoglyceride in pellets (mass ppm) | 210 | 280 | — | 110 |
| (C) Pentaerythritol stearic acid full ester (mass ppm) [addition amount, residual amount in pellets] | 300 | 140 | 500 | 60 |
| (D) Phosphorus-based antioxidant (Irg. 168) (mass ppm) [addition amount, residual amount in pellets] | 42 | 0 | 250 | 39 |
| Viscosity average molecular weight of PC resin (viscosity number) | 40.1 | 40.2 | — | 40.5 |
| Viscosity average molecular weight of PC resin in pellets (viscosity number) | 40.1 | 39.8 | 40.5 | 40.2 |
| Viscosity average molecular weight of PC resin in molded product (viscosity number) | 40.2 | 39.5 | 40.3 | 39.5 |
| Charged potential of molded product just after molding (V) | 450 | 410 | −1410 | −900 |
| Radial tilt MAX (Radius 23 to 58 mm) | 0.394 | 0.293 | 0.752 | 0.704 |
| Radial tilt MIN | −0.545 | −0.632 | −0.626 | −0.656 |
| Radial tilt MAX − MIN | 0.939 | 0.925 | 1.378 | 1.360 |
| Tangential tilt MAX | 0.394 | 0.191 | 0.349 | 0.304 |
| Tangential tilt MIN | −0.185 | −0.177 | −0.357 | −0.362 |
| Tangential tilt (Radius 23 to 58 mm) MAX − MIN | 0.579 | 0.368 | 0.706 | 0.666 |
| Adherence to die after continuous molding | No adherence | No adherence | No adherence | No adherence |
| Disc appearance after continuous molding | No problem | Turned yellow | White spots due to burr | White spots due to burr |
| Yield by defect inspection device | 97% | 96% | 78% | 90% |
| Number of polarization defects with diameter of 10 μm at constant temperature and humidity (defect/substrate) | 0.2 | 0.3 | 0.3 | 0.5 |

INDUSTRIAL APPLICABILITY

A molding material for a Blu-ray Disc substrate or a molding material for an HD DVD substrate of the present invention is used, to thereby provide a Blu-ray Disc substrate or an HD DVD substrate each having reduced appearance failures called comets.

The invention claimed is:

1. A molding material for a Blu-ray Disc substrate, comprising:
    an aromatic polycarbonate resin produced by an interfacial method (A);
    150 to 350 mass ppm of fatty acid monoglyceride having 14 to 30 carbon atoms (B) with respect to a total amount of the molding material;
    10 to 150 mass ppm of pentaerythritol fatty acid full ester (C) with respect to the total amount of the molding material; and
    30 to 120 mass ppm of an antioxidant (D) with respect to the total amount of the molding material.

2. A molding material for a Blu-ray Disc substrate according to claim 1, wherein a viscosity average molecular weight (Mv) of the aromatic polycarbonate resin produced by the interfacial method (A) is 14,000 to 17,000.

3. A molding material for a Blu-ray Disc substrate according to claim 1, wherein the pentaerythritol fatty acid full ester (C) comprises pentaerythritol palmitic acid full ester and/or pentaerythritol stearic acid full ester.

4. A method of producing a molding material for a Blu-ray Disc substrate, comprising:

introducing an aromatic polycarbonate resin produced by an interfacial method (A) into an extruder together with, with respect to the amount of the component (A), 170 to 380 mass ppm of fatty acid monoglyceride having 14 to 30 carbon atoms (B), 30 to 180 mass ppm of pentaerythritol fatty acid full ester (C), 30 to 120 mass ppm of an antioxidant (D), and 500 to 1,000 mass ppm of water (E) having an electrical conductivity of 1 μS/cm or less at 25° C. such that a water content of the polycarbonate resin in the extruder is adjusted to 500 to 1,300 mass ppm;

producing a strand from the mixture by melt extrusion molding;

cooling the strand; and cutting the strand into pellets.

5. A Blue-ray Disc substrate, formed by injection molding the molding material according to claim 1.

6. A molding material for an HD Digital Versatile Disc substrate, comprising:

an aromatic polycarbonate resin produced by an interfacial method (A);

150 to 350 mass ppm of fatty acid monoglyceride having 14 to 30 carbon atoms (B) with respect to a total amount of the molding material;

10 to 150 mass ppm of pentaerythritol fatty acid full ester (C) with respect to the total amount of the molding material; and 30 to 120 mass ppm of an antioxidant (D) with respect to the total amount of the molding material.

7. A molding material for an HD Digital Versatile Disc substrate according to claim 6, wherein a viscosity average molecular weight (Mv) of the aromatic polycarbonate resin produced by the interfacial method (A) is 14,000 to 17,000.

8. A molding material for an HD Digital Versatile Disc substrate according to claim 6, wherein the pentaerythritol fatty acid full ester (C) comprises pentaerythritol palmitic acid full ester and/or pentaerythritol stearic acid full ester.

9. A method of producing a molding material for an HD Digital Versatile Disc substrate, comprising:

introducing an aromatic polycarbonate resin produced by an interfacial method (A) into an extruder together with, with respect to the amount of the component (A), 170 to 380 mass ppm of fatty acid monoglyceride having 14 to 30 carbon atoms (B), 30 to 180 mass ppm of pentaerythritol fatty acid full ester (C), 30 to 120 mass ppm of an antioxidant (D), and 500 to 1,000 mass ppm of water (E) having an electrical conductivity of 1 μS/cm or less at 25° C. such that a water content of the polycarbonate resin in the extruder is adjusted to 500 to 1,300 mass ppm;

producing a strand from the mixture by melt extrusion molding;

cooling the strand; and cutting the strand into pellets.

10. An HD Digital Versatile Disc substrate, formed by injection molding the molding material according to claim 6.

11. A molding material for a Blu-ray Disc substrate according to claim 1, wherein the polycarbonate resin contains bisphenol A units.

12. A molding material for a Blu-ray Disc substrate according to claim 1, wherein a viscosity average molecular weight (Mv) of the aromatic polycarbonate resin (A) is 14,500 to 16,000.

13. A molding material for a Blu-ray Disc substrate according to claim 1, wherein a viscosity average molecular weight (Mv) of the aromatic polycarbonate resin (A) is 14,500 to 16,000.

14. A molding material for a Blu-ray Disc substrate according to claim 1, which contains 220 to 320 mass ppm of the fatty acid monoglyceride.

15. A molding material for a Blu-ray Disc substrate according to claim 1, which contains 80 to 120 mass ppm of the pentaerythritol fatty acid full ester (C).

16. A molding material for a HD Digital Versatile Disc substrate according to claim 6, wherein the polycarbonate resin contains bisphenol A units.

17. A molding material for a HD Digital Versatile Disc substrate according to claim 6, wherein a viscosity average molecular weight (Mv) of the aromatic polycarbonate resin (A) is 14,500 to 16,000.

18. A molding material for a HD Digital Versatile Disc substrate according to claim 6, wherein a viscosity average molecular weight (Mv) of the aromatic polycarbonate resin (A) is 14,500 to 16,000.

19. A molding material for a HD Digital Versatile Disc substrate according to claim 6, which contains 220 to 320 mass ppm of the fatty acid monoglyceride.

20. A molding material for a HD Digital Versatile Disc substrate according to claim 6, which contains 80 to 120 mass ppm of the pentaerythritol fatty acid full ester (C).

* * * * *